May 23, 1967
W. R. LYNCH
3,321,571
FLEXIBLE CONDUIT
Filed Feb. 2, 1965
2 Sheets-Sheet 1
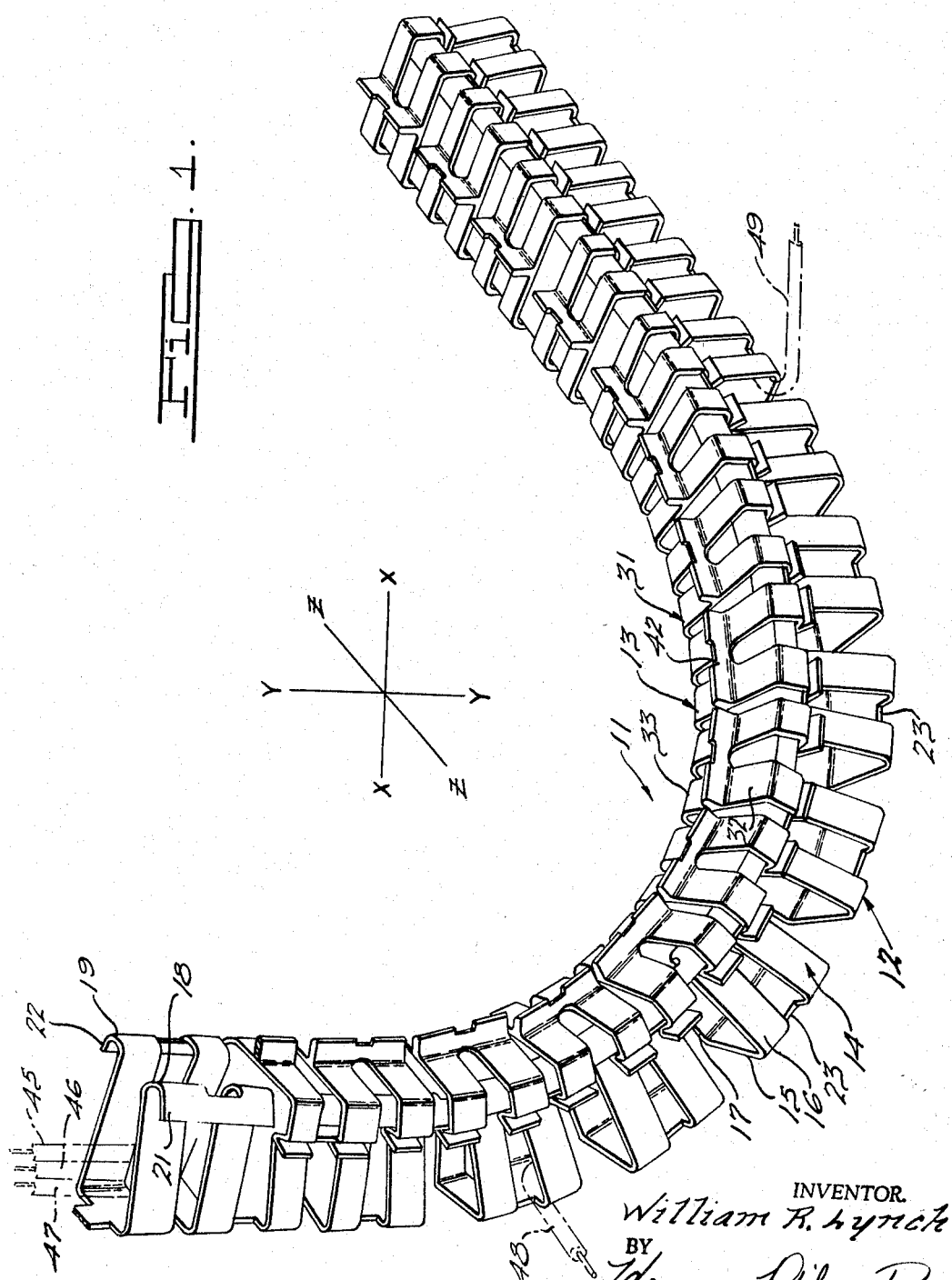
INVENTOR.
William R. Lynch
BY
Harness, Dickey & Pierce
ATTORNEYS.

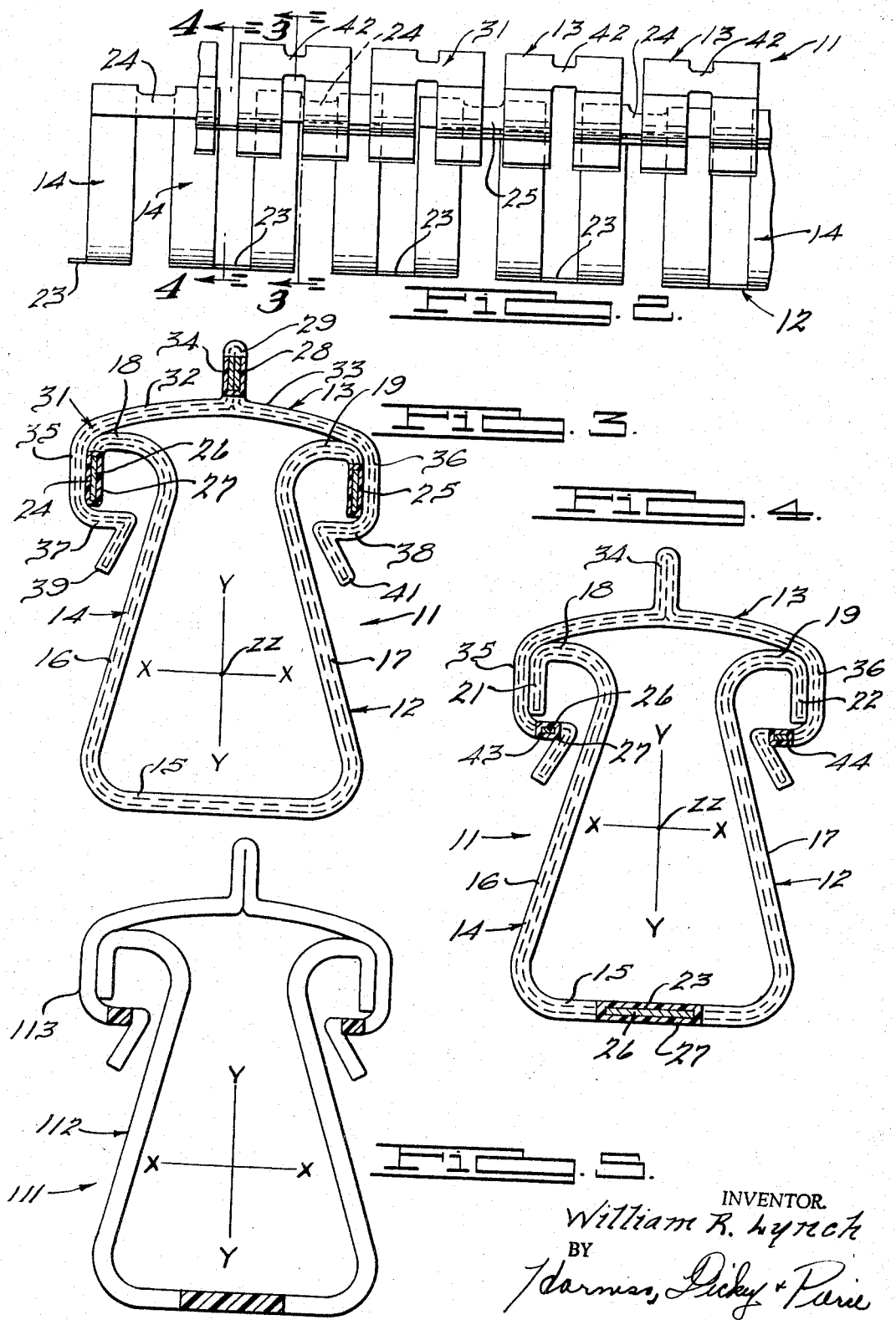

United States Patent Office 3,321,571
Patented May 23, 1967

3,321,571
FLEXIBLE CONDUIT
William R. Lynch, Birmingham, Mich., assignor to Republic Industrial Corporation, a corporation of Delaware
Filed Feb. 2, 1965, Ser. No. 429,745
6 Claims. (Cl. 174—101)

This invention relates generally to a conduit that encloses a plurality of electrical conductors and more particularly to an improved flexible conduit that is bendable so as to be capable of negotiating curves without requiring mitering or cutting.

Modern automation control panels are often a maze of relatively small electrical conductors. Heretofore, such electrical conductors have been tied in bundles or, alternatively, enclosed in rigid conduits which are required to be mitered to negotiate corners or curves. The above expedients are unsatisfactory since assembly is relatively slow and cumbersome, waste is excessive in the case of mitered rigid conduits, and access to the conductors often restricted.

This problem is solved, in accordance with the instant invention, by a flexible conduit made up of a plurality of longitudinally spaced elements that are integrally connected to one another by bridging bands. The bridging bands are divided into first and second groups each of which has a relatively low moment of inertia about respectively normally related axes so that the bridging bands are readily bendable about the respective axis. This construction permits the conduit to be freely bendable in all directions.

Accordingly, one object of the instant invention is an improved flexible conduit.

Another object of the invention is a flexible conduit that is capable of being relatively easily flexed in all directions relative to its longitudinal axis.

Other objects and advantages of this invention will be apparent from the following specification, claims and drawings, wherein:

FIGURE 1 is a perspective view of a flexible conduit embodying the instant invention showing the conduit flexed about three normally related axes;

FIG. 2 is a side elevational view of the conduit shown in FIG. 1;

FIG. 3 is a cross sectional view taken along the line 3—3 of FIG. 2;

FIG. 4 is a cross sectional view taken substantially along the line 4—4 of FIG. 2;

FIG. 5 is a cross sectional view, in part similar to FIG. 4, showing a modified flexible conduit.

Referring now in detail to the embodiments shown in FIGURES 1 through 4 of the drawings, a flexible conduit embodying this invention is indicated generally by the reference numeral 11. The flexible conduit 11 is comprised of a base 12 and a cover 13. The base 12 and the cover 13 are provided with interengaging gripping portions for securing the cover 13 relative to the base 12, as will become apparent as this description proceeds.

The base 12 is made up of a plurality of laterally spaced elements 14 of like cross sectional configuration in planes taken transverse to the normal longitudinal axis of the base portion 12. The longitudinal axis is identified as the ZZ axis in the drawings, the lateral axis being designated as X—X and Y—Y. The elements 14 have a generally channel or U-shaped section in the plane, containing the X—X and Y—Y axes.

Each U-shaped element 14 comprises a base portion 15 that terminates in upstanding legs 16 and 17. The upper ends of the legs 16 and 17 terminate in outwardly extending flanges 18 and 19 that terminate, in turn, in downwardly extending flanges 21 and 22.

A first pair of adjacent elements 14 are integrally connected by a first bridging band 23 that extends across the centers of the base portions 15. The next pair of adjacent elements 14 are integrally connected by bridging bands 24 and 25 that extend between the depending flange portions 21 and 22, respectively. It should be readily apparent that, progressing along the length of the base 12, a first pair of elements 14 are connected by a bridging band 23, the next pair by the bridging bands 24 and 25 and so on.

The base 12 may be formed from thin gauge spring steel stock 26 which has been suitably insulated by coating it with some form of electrical insulating material, for example, rubber, 27. As may be seen in FIGURE 1 the electrical insulating material has sufficient flexibility to permit bending of the base 12 without cracking of the insulating material. The metallic construction of the base 12 permits it to be used as a ground return.

The construction and orientation of the bridging bands 23, 24 and 25 permits the base 12 to be freely flexed about the X—X and Y—Y axes, respectively.

Referring to FIGURE 4, it should be readily apparent that the bridging bands 23 have a relatively low moment of inertia about a first bending or XX axis, which is normally disposed to the longitudinal ZZ axis of the base 12, since they are substantially parallel to it and have a thin cross section. Due to this low moment, the base 12 may be readily flexed about the XX axis, through bending of the first group of bridging bands 23. The bridging bands 23, however, have a relatively high moment of inertia with respect to a second bending or YY axis, which is normal to both the longitudinal ZZ axis and to the first bending axis or XX axis, since they are substantially normal to it. The second group of bridging elements 24 and 25, however, have a relatively low moment of inertia about the second bending or YY axis (FIGURE 3), since they lie substantially in a plane parallel to it. Therefore, any flexure of the base 12 about the YY axis takes place by bending of the bridging elements 24 and 25.

The cover 13 is made up of a core that is formed from spring steel stock, as indicated by the reference numeral 28. The core 28 is surrounded by a layer of resilient electrical insulating material, as identified by the reference numeral 29.

The cover 13, like the base 12, is comprised of a plurality of longitudinally spaced elements 31 that have like cross sectional configurations in planes taken normal to the longitudinal axis of the cover portion 13. In the disclosed embodiment the base elements 14 have a different axial spacing than the cover elements 31.

The elements 31 comprise a pair of laterally extending portions 32 and 33 that extend across the mouth of the channel shaped parts of the base 12. The portions 32 and 33 are integrally connected by an upstanding flange 34 that extends along the center of the cover 13. The portions 32 and 33 terminate in depending flanges 35 and 36, respectively, that engage the outer surfaces of the depending flanges 21 and 22 of the base 12. The depending flanges 35 and 36 terminate in inwardly extending flanges 37 and 38 that are adapted to grippingly engage the lower ends of the base flanges 21 and 22 to affix the cover 13 relative to the base 12. The flanges 37 and 38 also may be provided diverging flanges 39 and 41 at their inner extremities, if desired.

A first group of adjacent pairs of the elements 31 of the cover 13 are interconnected by a first group of integral bridging bands 42 that are formed integral with the flanges 34. The next adjacent pair of elements 31 are integrally connected by a second group of bridging bands 43 and 44 that are formed integrally with the inwardly extending flanges 37 and 38, respectively.

From the foregoing it should be apparent that the bridging bands 43 and 44 have a relatively low moment of inertia about the first bending or XX axis since they lie substantially in a plane that is parallel to it. Any bending of the cover 13 about the XX axis, therefore, may take place by bending of the bridging bands 43 and 44. The bridging bands 43 and 44, however, have a relatively high moment of inertia about the second bending or YY axis. The bridging bands 41, however, have a relatively low moment of inertia about this axis since they are substantially in a plane that is parallel to it. Bending about the YY axis may take place, therefore, through bending of the bridging bands 41. Since the bridging bands 41 have a relatively high moment of inertia about the XX axis, they will resist bending about this axis.

It should be readily apparent that when the cover 13 is engaged with the base 12, the resulting conduit 11 will be flexible about the XX and YY axes, since both the base 12 and the cover 13 are flexible about these axes. It also should be noted that there may be some relative movement between the interengaging surfaces of the cover 13 and the base 12 during the bending.

As shown in FIGURE 1, a plurality of conductors 45, 46, 47, 48 and 49 are contained within and supported by the base 12 and the cover 13. The conductors 45, 46, 47, 48 and 49 may be routed to various electrical components of a circuit board or other electrical device in which the conduit 11 is used. The conductors, because of their flexibility, will freely bend with the flexible conduit 11. Individual conductors may not extend the full length of the conduit 11 and may be routed to electrical elements that are positioned between the ends of the conduit 11. To accomplish this result, the ends of the conductors are merely extended from the base 12 between pairs of longitudinally spaced elements 14. FIGURE 1 illustrates the conductors 48 and 49 routed in this manner.

Referring now to FIGURE 5, an electrically insulated conduit, indicated generally by the reference numeral 111, is shown in cross-section. The conduit 111 comprises a base 112 and a cover 113 that grippingly engages the base 112. The base 112 and cover 113 are formed from a thin gauge resilient plastic material that has electrical insulating properties. The cross-sectional shape of both the base 112 and cover 113 and construction are identical to the construction of the embodiment shown in FIGURES 1 through 4 and will not be described in detail.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A flexible conduit formed to define a longitudinal axis and being freely bendable about axes extending laterally of said longitudinal axis comprising,
a plurality of longitudinally spaced elements having generally like cross sectional configurations in planes normal to said longitudinal axis and,
first and second bridging means integrally connecting alternate elements, respectively, to one another along the length of said flexible conduit, there being at least one such bridging means between adjacent elements,
said first bridging means having a relatively low moment of inertia about a first bending axis that is normal to said longitudinal axis to facilitate bending of said flexible conduit about said first bending axis, said first bridging means having a relatively high moment of inertia about a second bending axis that is normal to said longitudinal axis and to said first bending axis to resist bending of said flexible conduit about said second bending axis,
said second bridging means having a relatively low moment of inertia about said second bending axis to facilitate bending of said flexible conduit about said second bending axis and a relatively high moment of inertia about said first bending axis to resist bending of said flexible conduit about said first bending axis,
the spacing of said elements being such that conductors contained within and supported by said flexible conduit can be extended between an adjacent pair of said elements.

2. A flexible conduit comprising,
a flexible base, and
a flexible cover,
each of said flexible base and said flexible cover being formed to define a longitudinal axis of said conduit and being freely bendable about axes extending laterally of said longitudinal axis, each of said flexible base and said flexible cover comprising,
a plurality of longitudinally spaced elements having generally like cross sectional configurations in planes normal to said longitudinal axis, and,
first and second bridging means integrally alternately connecting said longitudinally spaced elements to one another, respectively, there being at least one of such bridging means between adjacent elements,
said first bridging means having a relatively low moment of inertia about a first bending axis that is normal to said longitudinal axis to facilitate bending about said first bending axis, said first bridging means having a relatively high moment of inertia about a second bending axis that is normal to said longitudinal axis and to said first bending axis to resist bending about said second bending axis,
a second briding means having a relatively low moment of inertia about said second bending axis to facilitate bending about said second bending axis and a relatively high moment of inertia about said first bending axis to resist bending about said first bending axis,
said flexible base and said flexible cover having interengaging gripping portions for securing said cover to said base.

3. An insulated flexible conduit comprising,
a flexible base, and
a flexible cover,
each of said flexible base and said flexible cover being formed to define a longitudinal axis for said conduit and being freely bendable about axes extending laterally of said longitudinal axis, each of said flexible base and said flexible cover comprising,
a plurality of longitudinally spaced elements having generally like cross sectional configurations in planes normal to said longitudinal axes, and,
first and second bridging means integrally and alternately connecting said longitudinally spaced elements to one another, respectively, there being at least one of such bridging means between adjacent elements,
a first group of said first bridging means having a relatively low moment of inertia about a first bending axis that is normal to said longitudinal axis to facilitate bending about said first bending axis, said first group of bridging means having a relatively high moment of inertia about a second bending axis that is normal to said longitudinal axis and to said first bending axis to resist bending about said second bending axis, a second group of said second bridging means having a relatively low moment of inertia about said second bending axis to facilitate bending about said second bending axis and a relatively high moment of inertia about said first bending axis to resist bending about said first bending axis, said flexible base and said flexible cover having interengaging gripping portions for securing said cover to said base, each of said base and said cover comprising a core formed from a material having a relatively high coefficient of electrical conductivity and an insulating coating having a relatively low coefficient of electrical conductivity surrounding said core.

4. A flexible conduit comprising, a flexible electrically insulated base, and a flexible electrically insulated cover, each of said base and said cover being formed to define a longitudinal axis of said conduit and being freely bendable about axes extending laterally of said longitudinal axis, each of said base and said cover comprising, a plurality of longitudinally spaced elements having generally like cross sectional configurations in planes normal to said longitudinal axis and, first and second relatively narrow bridging bands alternately connecting said elements to one another, respectively, said first group of said bridging bands being oriented substantially parallel to a first plane extending parallel to said longitudinal axis to facilitate bending about an axis extending transversely to said longitudinal axis and parallel to said first plane, said second group of said bridging bands being oriented substantially parallel to a second plane extending parallel to said longitudinal axis and generally normal to said first plane to facilitate bending about an axis extending transversely to said longitudinal axis and parallel to said second plane, said base and said cover having, interengaging gripping portions for retaining said cover upon said base.

5. An electrically insulated flexible conduit comprising, an electrically insulated flexible base and flexible cover for said base, said cover and said base being formed to define a longitudinal axis for said conduit and being freely bendable about axes extending laterally of said longitudinal axis, said flexible base comprising, a plurality of longitudinally spaced generally channel shaped elements, each of the legs of said channel shaped elements terminating in, a depending flange, said flexible cover comprising, a plurality of longitudinally spaced elements extending across the mouth of said channel shaped elements and terminating at each side in, a depending flange, said depending flange of said cover terminating in, inwardly extending projections that grippingly engage the depending flanges of said base, the longitudinally spaced elements of each of said cover and said base being integrally connected to one another, respectively, along the length of said cover and said base by, first and second bridging means, spaced alternately between said elements, respectively, there being at least one of such bridging means between adjacent of said longitudinally spaced elements, said first bridging means having a relatively low moment of inertia about a first bending axis that is normal to said longitudinal axis to facilitate bending about said first bending axis, said first bridging means having a relatively high moment of inertia about a second bending axis that is normal to said longitudinal axis and to said first bending axis to resist bending of said cover and said base about said second bending axis, said second bridging means having a relatively low moment of inertia about said second bending axis to facilitate bending of said cover and said base about said second bending axis and a relatively high moment of inertia about said first bending axis to resist bending of said cover and said base about said first bending axis.

6. An electrically insulated flexible conduit comprising, an electrically insulated flexible base formed to define a longitudinal axis and being freely bendable about axes extending laterally of said longitudinal axis, said flexible base comprising, a plurality of longitudinally spaced generally channel shaped elements, each of the legs of said channel shaped elements terminating in, a depending flange, said channel shaped elements being integrally connected along the length of said base by, a first series of bridging means, there being at least one of such bridging means between adjacent channel shaped elements, a first group of said first series of bridging means being integrally connected to the bases of adjacent channel shaped elements and having a relatively low moment of inertia about a first bending axis that is normal to the longitudinal axis of said base to facilitate bending about said first bending axis, said first group having a relatively high moment of inertia about a second bending axis that is normal to the longitudinal axis of said base and to said first bending axis to resist bending of said base about said second bending axis, a second group of said bridging means integrally connecting the depending flanges of adjacent said channel shaped elements, said second group of bridging means between disposed in alternating relationship to said first group and having a relatively low moment of inertia about said second bending axis to facilitate bending of said base about said second bending axis and a relatively high moment of inertia about said first bending axis to resist bending about said first bending axis, an electrically insulated flexible cover for said base, said flexible cover being formed to define a longitudinal axis and being freely bendable in all directions relative to said longitudinal axis, said flexible cover comprising, a plurality of longitudinally spaced elements extending across the mouths of the channel shaped elements of said base and terminating at each side in, depending flange portions, said depending flange portions of said cover terminating in, inwardly extending projections that grippingly engage the depending flange portions of said base, the longitudinally spaced elements of said cover being integrally connected to one another along the length of said cover by a second series bridging means, there being at least one of such second series of bridging means between adjacent longitudinally spaced elements of said cover, a first group of said second series of said bridging means being integrally connected to said longitudinally spaced elements and having a relatively low moment of inertia about said second bending axis to facilitate bending of said cover about said second bending axis and a relatively high moment of inertia about said first bending axis to resist bending about said first bending axis, a second group of said second series of bridging means being integrally connected to the inwardly extending projections of said cover and having a relatively low moment of inertia about said first bending axis to facilitate bending of said cover about said first bending axis and a relatively high moment of inertia about said second bending axis to resist bending of said cover about said second bending axis.

References Cited by the Examiner

UNITED STATES PATENTS 3,082,984  3/1963  Larson et al. ------ 174—72 X

DARRELL L. CLAY, *Primary Examiner.*